(12) United States Patent
Regnier et al.

(10) Patent No.: US 10,730,575 B2
(45) Date of Patent: Aug. 4, 2020

(54) BICYCLE NAVIGATION METHOD AND BICYCLE HANDLEBAR

(71) Applicant: VEL'CO, Nantes (FR)

(72) Inventors: Pierre Regnier, Thouare-sur-Loire (FR); Romain Savoure, Martigne-Ferchaud (FR); Johnny Smith, Boulogne-Billancourt (FR)

(73) Assignee: VEL'CO, Nantes (FR)

( * ) Notice: Subject to any disclaimer, the term of this patent is extended or adjusted under 35 U.S.C. 154(b) by 0 days.

(21) Appl. No.: 16/306,739

(22) PCT Filed: Jun. 2, 2017

(86) PCT No.: PCT/EP2017/063520
§ 371 (c)(1),
(2) Date: Dec. 3, 2018

(87) PCT Pub. No.: WO2017/207782
PCT Pub. Date: Dec. 7, 2017

(65) Prior Publication Data
US 2019/0127005 A1    May 2, 2019

(30) Foreign Application Priority Data

Jun. 3, 2016   (FR) ..................... 16 55071

(51) Int. Cl.
*B62J 6/05*       (2020.01)
*B62K 21/12*      (2006.01)
(Continued)

(52) U.S. Cl.
CPC .............. *B62J 6/05* (2020.02); *B62K 21/12* (2013.01); *G01C 21/20* (2013.01);
(Continued)

(58) Field of Classification Search
CPC ...... B62J 6/005; B62K 21/12; G01C 21/3626; G01C 21/3632; G01C 21/20; G01S 19/14; G01S 2205/002
See application file for complete search history.

(56) References Cited

U.S. PATENT DOCUMENTS

2003/0187577 A1* 10/2003 McClure ............. A01B 69/008
                                                         701/23
2012/0078511 A1*  3/2012 Lim .................. G01C 21/3632
                                                         701/437
(Continued)

FOREIGN PATENT DOCUMENTS

KR    20160046791 A    4/2016
WO    2016079620 A1    5/2016

OTHER PUBLICATIONS

French Search Report dated Jan. 26, 2017 for corresponding French Application No. 1655071, filed Jun. 3, 2016.
(Continued)

*Primary Examiner* — Mirza F Alam
(74) *Attorney, Agent, or Firm* — David D. Brush; Westman, Champlin & Koehler, P.A.

(57) ABSTRACT

A method for guiding a cyclist on a bicycle equipped with a bicycle handlebar. The method includes: on each side of a central zone in which the bicycle handlebar is attached to the bicycle handlebar stem, separately illuminating a proximal light-emitting zone located next to the central attachment zone or a distal light-emitting zone depending on the route to be followed.

13 Claims, 1 Drawing Sheet

(51) Int. Cl.
G01C 21/20 (2006.01)
G01C 21/36 (2006.01)
B62J 6/057 (2020.01)
B62J 6/165 (2020.01)
B62J 50/25 (2020.01)

(52) U.S. Cl.
CPC ..... *G01C 21/3626* (2013.01); *G01C 21/3632* (2013.01); *B62J 6/057* (2020.02); *B62J 6/165* (2020.02); *B62J 50/25* (2020.02)

(56) References Cited

U.S. PATENT DOCUMENTS

| | | | | |
|---|---|---|---|---|
| 2013/0335986 | A1* | 12/2013 | Berry | B62J 6/00 362/473 |
| 2014/0180582 | A1* | 6/2014 | Pontarelli | G01C 21/20 701/494 |
| 2014/0343843 | A1* | 11/2014 | Yanku | G01C 21/26 701/491 |
| 2015/0285657 | A1* | 10/2015 | Sarvestani | G01C 22/002 702/19 |
| 2017/0082450 | A1* | 3/2017 | Alberola | G01C 21/3632 |

OTHER PUBLICATIONS

International Search Report dated Sep. 19, 2017 for corresponding International Application No. PCT/EP2017/063520, filed Jun. 2, 2017.
Written Opinion of the International Searching Authority dated Sep. 19, 2017 for corresponding International Application No. PCT/EP2017/063520, filed Jun. 2, 2017.
Wagner Salves: "Hammerhead Navigation 1.0 gps bike", Nov. 6, 2013 (Nov. 6, 2013), pp. 1-3, XP054977083. Retrieved from Internet: URL:https//www.youtube.com/watch?v=bGH9J3c8_Tw. Retrieved on Jan. 19, 2017.
English Translation of Written Opinion of the International Searching Authority dated Sep. 27, 2017 for corresponding International Application No. PCT/EP2017/063520, filed Jun. 2, 2017.

* cited by examiner

BICYCLE NAVIGATION METHOD AND BICYCLE HANDLEBAR

CROSS-REFERENCE TO RELATED APPLICATIONS

This Application is a Section 371 National Stage Application of International Application No. PCT/EP2017/063520, filed Jun. 2, 2017, the content of which is incorporated herein by reference in its entirety, and published as WO2017/207782 on Dec. 7, 2017, not in English.

FIELD OF THE DISCLOSURE

This invention relates in general to a bicycle handlebar equipped with light sources and a method of guiding a cyclist by means of such a bicycle handlebar.

BACKGROUND OF THE DISCLOSURE

Bicycles are known in prior art equipped with guide means like those described in document WO2014205345 (A2).

On the other hand, this system has the particular disadvantage that it does not provide efficient and intuitive guidance for the cyclist.

Removable guidance accessories are also known, such as those disclosed at www.youtube.com/watch?v=bGH9J3c8_Tw called Hammerhead, or a portable telephone fixed on a bicycle stem as described in document KR20160046791 A. However, these accessories can drop off if the road being used is uneven, and they do not provide intuitive guidance either.

SUMMARY

One purpose of this invention is to provide a solution to the disadvantages of these documents according to prior art mentioned above and in particular, firstly, to disclose a bicycle handlebar that offers an efficient and intuitive guidance method to a cyclist.

To achieve this, a first aspect of the invention relates to a method for guiding a cyclist on a bicycle equipped with a bicycle handlebar, said method comprising steps of:

separately illuminating a proximal light-emitting zone located close to the central attachment zone or a distal light-emitting zone on each side of a central zone at which the bicycle handlebar is attached to the bicycle stem, depending on the route to be followed. The method according to the invention proposes to manage proximal and distal light-emitting zones on each side of the bracket distinctly (therefore separately) to guide the cyclist. Consequently, illumination combinations can be planned to guide the cyclist efficiently. Obviously, the invention is not limited to controlling two proximal and distal zones twice.

Advantageously, the light-emitting zones are integrated into the handlebar, in other words they cannot be moved. In other words, they remain on the handlebar tube at all times. This assures that the light-emitting zones do not become detached from the handlebar, even if the road being used is uneven and causes shaking.

In particular, if the distal light-emitting zone and the proximal light-emitting zone are grouped on each side of the central attachment to form a single light-emitting surface on each side, then this light-emitting surface has a proximal end (towards the centre, the proximal light-emitting zone) and a distal end (towards the outside of the handlebar, the distal light-emitting zone) and the method proposes to distinctly illuminate the ends of each light-emitting surface, for example in combination with one end of the other light-emitting surface, to increase the possibilities of transmitting information to the cyclist. In other words, the two light-emitting surfaces arranged on each side of the handlebar stem, each comprise one end on the side of the stem (the proximal end) and one end towards the outside of the handlebar (the distal end).

Advantageously, at least each of the proximal light-emitting zones and/or each of the distal light-emitting zones is illuminated when the cyclist should go straight ahead at an intersection. The combination of illumination of the two central light zones informs the cyclist that he or she must go straight ahead. In other words, there is a balance in light emitted on each side of the bicycle stem, so that the cyclist understands that he or she should go straight ahead. The method plans to illuminate the same zones on each side of the handlebar when the direction does not have to be changed. This implementation provides positive information to the cyclist that he or she should go straight ahead, which is different from an apparatus wherein light-emitting zones are illuminated only when the cyclist has to turn. In the latter case, the user must deduce from the absence of light that he or she should go straight on. On the other hand according to this implementation of the invention, the two proximal and/or the two distal zones are illuminated, such that the cyclist immediately knows that he or she must not turn.

Advantageously, the method comprises, when approaching an exit from a roundabout to be taken by the cyclist among a plurality of exits from the roundabout, a step of illuminating a number of distinct light-emitting points integrated into the handlebar, the number of distinct light-emitting points being indicative of the number of the exit to be used. In other words, the guidance method takes account of the number of the exit to be followed (that corresponds to the number of exits to be passed but not followed, plus one), to illuminate a corresponding quantity of light-emitting points. For example, if the cyclist has to exit at the first exit encountered, the method will illuminate only one light-emitting point, and for example if the cyclist has to exit at the third exit (in other words he or she passes two exits on the roundabout before exiting from it), the method will illuminate three light-emitting points. Therefore there is a step of identifying a roundabout on the route to be followed, counting the number of exits not to be taken and displaying a number of light-emitting points that is the number of exits not to be taken, plus one.

Consequently, the invention relates to a method of guiding a cyclist riding a bicycle equipped with a bicycle handlebar, comprising a step, when approaching an exit from a roundabout to be taken by the cyclist among a plurality of exits from the roundabout, a step of illuminating a number of distinct light-emitting points integrated into the handlebar, the number of distinct light-emitting points being indicative of the number of the exit to be taken.

Advantageously, the number of illuminated light-emitting points decreases by one unit every time that the cyclist goes past one exit from the roundabout that is not to be taken.

Advantageously, at least one distal and/or proximal light-emitting zone is illuminated when the cyclist needs to turn at an intersection, on the distal and/or proximal light-emitting zone concerned.

Advantageously, the at least one distal zone and/or proximal zone located on the side opposite the side on which the cyclist has to turn is/are off. According to the two above embodiments, the centre of gravity of light is shifted towards the side to which the cyclist needs to turn, which is very intuitive for the cyclist. In other words, there is a light unbalance towards the side to which the turn is to be made.

In one preferred embodiment, it is planned to illuminate all light-emitting zones on the side to which the turn is to be made, and all zones on the opposite side will be off. As an alternative, it would be possible to illuminate a first colour (such as green) on the side to which the turn is to be made, and to illuminate the side to which the turn is not to be made in a different colour (such as red).

Advantageously, if the cyclist needs to make a U-turn, the method includes:
 a step of illuminating the two distal zones simultaneously, then,
 a step of illuminating the two proximal zones simultaneously,
 a step of switching all light-emitting zones off.

In other words, the method displays two light chasers on each side of the stem, that move towards the centre of the handlebar (towards the stem) at the same time to tell the cyclist to make a U-turn.

Advantageously, at least the distal light-emitting zone is illuminated flashing when the cyclist needs to turn towards the distal light-emitting zone concerned. Therefore there is a specific illumination sequence at the approach to an intersection, or on arrival at the intersection. For example, it would be possible to illuminate continuously starting at 50 m from the intersection concerned, and make them flash when it is time to make the turn.

Advantageously, the guide method includes an initial matching step between the bicycle handlebar and a portable electronic navigation unit. Therefore the handlebar is a relay of the portable electronic unit, such as a mobile telephone, or smartphone. Therefore navigation and/or map calculations are managed by the telephone, and the telephone simply sends control instructions to the handlebar to illuminate light-emitting zones depending on which road is to be taken.

Advantageously, the guide method includes a step to illuminate a light indicator and/or light sources with a particular sequence or colour when the portable electronic unit receives a notification or a message or a call for the cyclist.

Advantageously, the guide method is used by a geopositioning unit and/or a calculation unit on board the handlebar.

A second aspect of the invention relates to a bicycle handlebar comprising a plurality of light sources arranged on each side of a central attachment of the bicycle handlebar on a stem of the bicycle, and arranged to notify a user about a road to be followed, characterised in that the bicycle handlebar comprises light sources on each side of the central attachment zone, to form a first light-emitting zone, such as a proximal light-emitting zone located towards the central attachment zone of the bicycle handlebar, and a second light-emitting zone, such as a distal light-emitting zone arranged to be illuminated distinctly depending on the road to be followed. Therefore the bicycle handlebar according to this embodiment can created illumination combinations between each proximal and/or distal light-emitting zone on each side of the stem, which increases guidance possibilities.

Advantageously, the light sources are integrated into the handlebar. Thus the light sources form light-emitting zones and light-emitting points. The same light sources can act as light-emitting zones (all light sources lit) and light points (a partial number of light sources are lit, for example one out of two or one out of three light sources are lit).

In other words, the same light sources can be used to inform the cyclist when passing an intersection and when going around a roundabout, but simply the management will be different. In the first case, the proximal or distal zones are illuminated, and in the second case, distinct light points are formed on a single light-emitting zone, to indicate the exit number.

Advantageously, the light sources are arranged to form light-emitting zones to guide the cyclist at an intersection, and light-emitting points to guide the cyclist when he or she approaches or passes around a roundabout, Alternatively, in one particular embodiment, the light-emitting zones are separated from the light points. This can avoid confusion, separating the position and location of light-emitting zones and light-emitting points on the handlebar. However, the light sources forming the light-emitting zones and the light-emitting points are integrated into the handlebar, in other words are permanently fixed on the handlebar, to prevent them from falling off.

Advantageously, the bicycle handlebar comprises at least one removable battery and at least one auxiliary battery arranged to supply power to the light sources if said removable battery is removed from the handlebar. The removable battery may be the principal energy source, and the auxiliary battery can be designed to provide a power supply at least while replacing a removable battery.

Advantageously, said at least one auxiliary battery is also removable.

Advantageously, the bicycle handlebar comprises a connection interface at at least one of its ends, and the removable battery is arranged so that it can be mounted on said connection interface. Mounting by clip-fitting or by a bayonet type interface could be envisaged. It would also be possible to provide an internal attachment to the tube with an open jaw or olive fitting and held in contact by a screw on the inside diameter of the handlebar tube.

Advantageously, the bicycle handlebar comprises wireless communication means. For example, a communication chip conforming with the Bluetooth standard can be envisaged.

Advantageously, the bicycle handlebar comprises at least one headlight.

Advantageously, the light sources are arranged to emit lights with different colours, depending on the route to be followed and/or events related to navigation, such as the approach to a dangerous zone, a zone with a specific speed limit, etc.

Advantageously, the handlebar may comprise a coloured light source (a blue LED) to relay or inform by a notification from the telephone.

Advantageously, the light sources are light-emitting diodes covered by a translucent wall, each forming a light-emitting zone.

Advantageously, the light sources are housed in holes formed in a tube forming the structure of the bicycle handlebar. Thus, there is no protuberance.

Advantageously, the translucent wall is clip fitted, or glued and/or screwed onto the tube forming the structure of the bicycle handlebar. Therefore, is fixed no-removably.

A third aspect of the invention relates to a bicycle comprising a bicycle handlebar according to the second aspect of the invention.

BRIEF DESCRIPTION OF THE DRAWINGS

Other characteristics and advantages of this invention will become clearer after reading the following detailed description of one embodiment of the invention given as a non-limitative example, and illustrated by the appended drawings among which.

DETAILED DESCRIPTION OF ILLUSTRATIVE EMBODIMENTS

Figure 1:
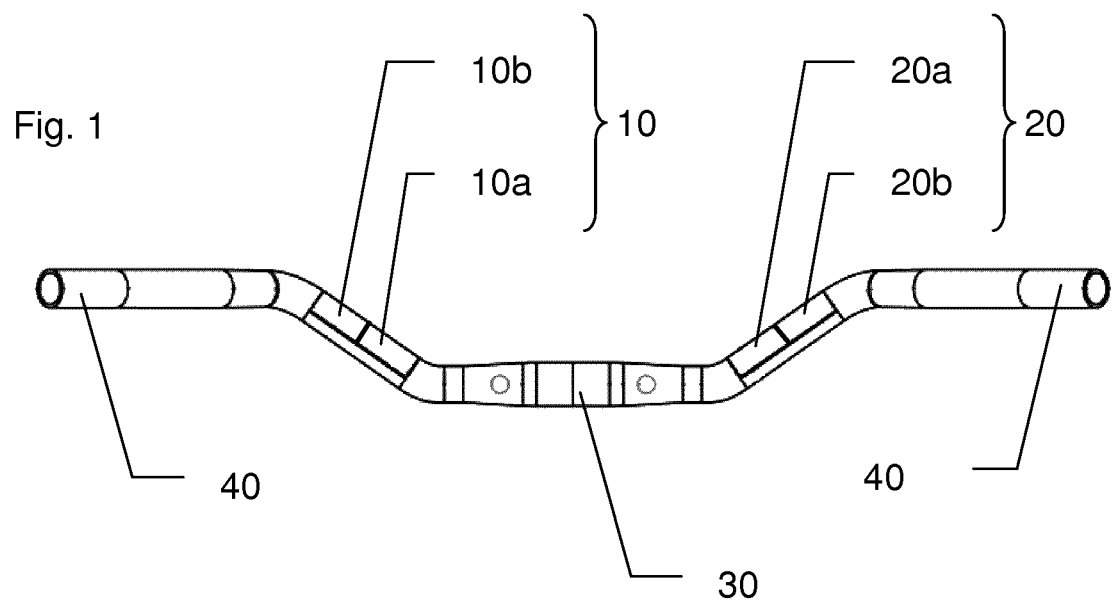
FIG. 1 represents a sectional view of a bicycle handlebar according to the invention.

FIG. 1 shows a bicycle handlebar according to the invention with a central attachment zone 30 designed to be fixed for example to a bicycle stem.

The bicycle handlebar also comprises two light-emitting surfaces 10 and 20 each located adjacent to the central attachment zone 30. The light-emitting surface 10 is to the left of the central attachment zone, and the light-emitting surface 20 is to its right.

Each light-emitting surface 10 and 20 comprises for example a cache made of a translucent material and at least two light-emitting diodes under the cache of translucent material, so that a proximal end and a distal end can be illuminated independently on each light-emitting zone 10 and 20. In other words, the proximal ends form proximal light zones 10a and 20a close to the centre or the mid-point of the handlebar, and the distal ends form distal light-emitting zones 10b and 20b towards the exterior of the handlebar.

The light emitting diodes that cannot be seen on FIG. 1 can be housed in holes in the handlebar, and fixed by means of a resin, or held in place by supports that are clip-fitted (elastically engaged), or glued and/or screwed onto the handlebar. It could also be envisaged to mount light-emitting diodes on a printed circuit or on an electronic board itself mounted on or inserted in the handlebar.

In particular, the light sources (diodes) can be inserted inside a transparent plastic support that is screwed-glued onto the handlebar.

Therefore it can be seen that the light sources and the light-emitting zones thus formed are directly integrated into the handlebar and cannot be detached from it. This guarantees that they cannot be detached or separated.

The bicycle handlebar also comprises an electronic control unit arranged to control the light-emitting diodes, and wireless communication means, for example a communication chip conforming with the Bluetooth standard, connected to the control unit and arranged to set up a wireless connection with a portable electronic unit for example such as a telephone.

The bicycle handlebar also comprises two removable batteries 40 that are removably fixed to the ends of the bicycle handlebar, to supply electrical energy to an auxiliary battery permanently installed on the bicycle handlebar (not shown on FIG. 1), and also to other electrical or electronic components, such as the control unit, the wireless communication means, or other devices such as one or more headlights, a horn, etc.

Preferably, it could be envisaged to insert removable batteries inside the handlebar tube to provide maximum protection for them, and removing will not reduce the useful length of the handlebar.

The removable batteries 40 can be fixed to the bicycle handlebar by rotation of a ¼ turn for example with a bayonet fitting, or by clip-fitting (elastic engagement) or screwing, to set up an electrical contact with a connection interface connected to the electrical circuit of the bicycle handlebar.

Therefore the bicycle handlebar can set up a connection (wireless) for example with a portable telephone on which navigation and/or positioning means have been installed (a global navigation system (GNSS) such as GPS, GLONASS or Galileo), and navigation means to calculate a route to be followed. With a specific program, it is then possible to control the light-emitting diodes on the bicycle handlebar from the telephone, to illuminate light-emitting zones to inform the cyclist of the route to be followed. The advantage of a wireless connection is that the master electronic unit can remain in the cyclist's pocket, sheltered from the weather, while controlling the slave handlebar.

Figure 2:
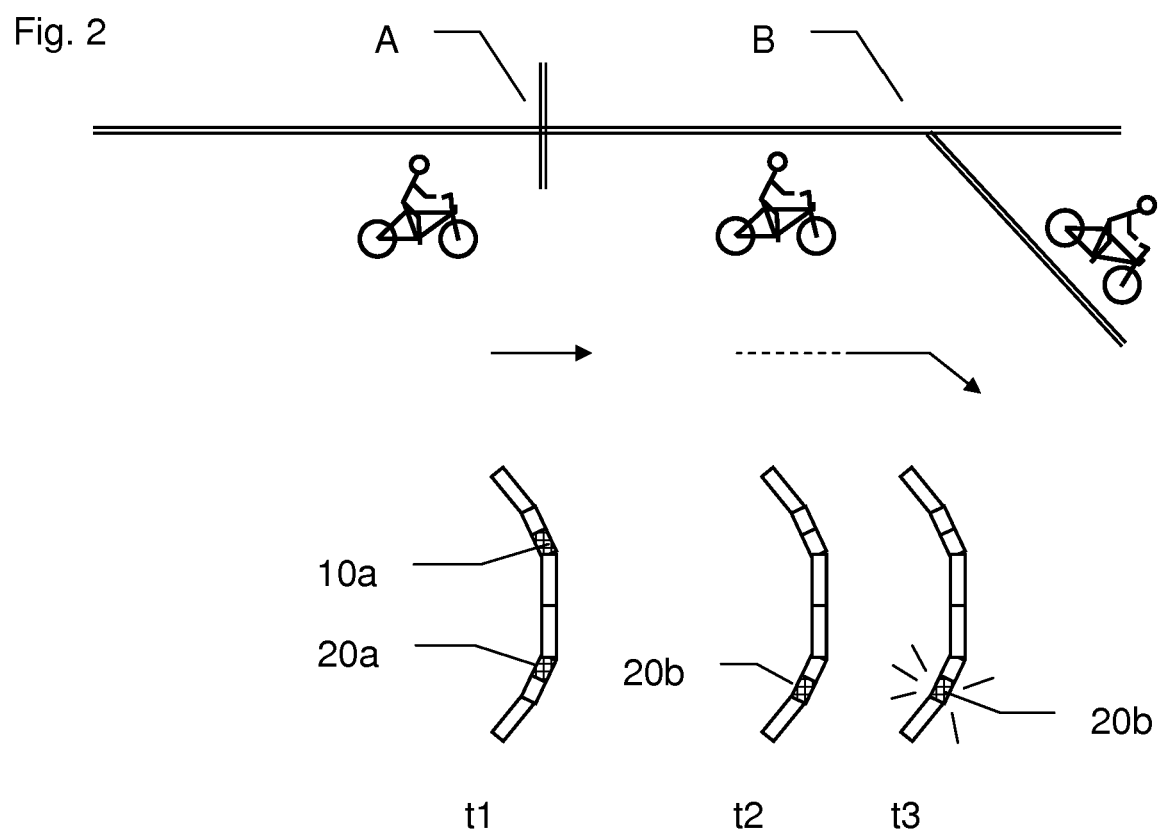
FIG. 2 represents an example of navigation along a road to be followed, with a diagrammatic top view of the handlebar in FIG. 1, at intersections along the road to be followed.

In particular, one or more illumination sequences can be sent to the control unit through the communication means. For example, at an intersection A on FIG. 2 at which the cyclist has to go straight on, the two proximal zones 10a and 20a are illuminated simultaneously at time t1. Consequently, the cyclist understands from the lights that are switched on or illuminated on the two parts closest to the bicycle stem, that he or she must not turn at this intersection A.

On the other hand, at intersection B, the cyclist must turn right. All illuminated zones on the left side are off at time t2, and at least one of the proximal light-emitting zones 20a and distal light-emitting zones 20b is illuminated, to inform the cyclist that he or she will soon need to change direction, for example 50 m before reaching intersection B. The proximal light-emitting zone 20a can also be illuminated.

At time t3, in other words when the cyclist reaches intersection B, at least the distal light-emitting zone 20b is illuminated flashing to indicate that it is time to change direction and that he or she must turn right. The proximal light-emitting zone 20a can also be illuminated flashing.

It is also possible to make the proximal light-emitting zones 10a and 20a visible to the cyclist alone, and the distal light emitting zones 10b and 20b visible to the cyclist but also to a road user facing the cyclist (for example a car driver arriving from the opposite direction) to inform the driver that the cyclist intends to turn.

It will be understood that an expert in the subject can make various obvious modifications and/or improvements to the different embodiments of the invention described in this description without going outside the framework of the invention defined by the appended claims. In particular, reference is made to two light-emitting surfaces 10 and 20, but more light-emitting zones could also be envisaged. Reference is also made to a wireless connection between the portable electronic unit and the bicycle handlebar, but a wired connection could also be envisaged if the electronic unit were permanently fixed and connected to the handlebar.

The invention claimed is:

1. A method for guiding a cyclist riding a bicycle equipped with a bicycle handlebar, said method comprising:
   illuminating at least one of a plurality of lights that are integrated in the bicycle handlebar, the plurality of lights comprising, on each side of a central attachment zone of the bicycle handlebar fixed to a bicycle handlebar stem, a proximal light-emitting zone, which is located close to the central attachment zone, and a distal light-emitting zone, the illuminating comprising separately illuminating on at least one side of the central attachment zone the proximal light-emitting zone or the distal light-emitting zone, depending on a route to be followed, and wherein at least one of the proximal or distal light-emitting zones on one side of the central attachment zone is separately illuminated relative to a corresponding one of the proximal or distal light-emitting zone on the other side of the central attachment zone depending on the route.

2. The method for guiding according to claim 1, comprising illuminating at least each of the proximal light-emitting zones and/or each of the distal light-emitting zones when the cyclist should go straight ahead at an intersection.

3. The method for guiding according to claim 1, comprising, when approaching an exit from a roundabout to be taken by the cyclist among a plurality of exits from the roundabout, illuminating a number of distinct light-emitting points integrated into the handlebar, the number of distinct light-emitting points being indicative of the number of the exit to be used.

4. The method for guiding according to claim 3, wherein the number of illuminated light-emitting points decreases by one unit every time the cyclist goes past one exit from the roundabout that is not to be taken.

5. The method for guiding according to claim 1, comprising illuminating at least one distal and/or proximal light-emitting zone when the cyclist needs to turn at an intersection towards the side of the distal and/or proximal light-emitting zone being illuminated, and wherein at least the distal and/or proximal zone located on the side opposite the direction in which the cyclist should turn are off.

6. The method for guiding according to claim 1, comprising flashing at least the distal light-emitting zone when the cyclist has to turn towards the side of the distal light-emitting zone being flashed.

7. The method for guiding according to claim 1, wherein in response to the cyclist having to make a U-turn, the method includes:
   illuminating the distal light-emitting zones on both sides of the central attachment zone simultaneously, then,
   illuminating the proximal light-emitting zones on both sides of the central attachment zone simultaneously,
   switching all light-emitting zones off.

8. A bicycle handlebar comprising:
   a central attachment zone at which the bicycle handlebar is attachable on a stem of the bicycle;
   a plurality of light sources arranged and integrated into the handlebar, the plurality of light sources comprising, on each side of the central attachment zone, a proximal light-emitting zone, which is located close to the central attachment zone, and a distal light-emitting zone, the distal light-emitting zone on each side of the central attachment zone being arranged to be illuminated separately from the proximal light-emitting zone on that side of the central attachment zone depending on a road to be followed, and wherein at least one of the proximal or distal light-emitting zones on one side of the central attachment zone is separately illuminated relative to a corresponding one of the proximal or distal light-emitting zone on the other side of the central attachment zone depending on the route.

9. The bicycle handlebar according to claim 8, comprising at least one removable battery and at least one auxiliary battery arranged to supply power to the light sources if said removable battery is removed from the handlebar.

10. The bicycle handlebar according to claim 8, comprising a control unit configured to control the plurality of light sources and a wireless communication circuit connected to the control unit and configured to set up a wireless connection with a portable electronic unit.

11. The bicycle handlebar according to claim 8, wherein the light sources are light-emitting diodes covered by a translucent wall, each forming a respective light-emitting zone.

12. A bicycle comprising a bicycle handlebar according to claim 8.

13. A method for guiding a cyclist riding a bicycle equipped with a bicycle handlebar, said method comprising:
   illuminating at least one of a plurality of lights that are integrated in the bicycle handlebar, the plurality of lights comprising, on each side of a central attachment zone of the bicycle handlebar fixed to a bicycle handlebar stem, a proximal light-emitting zone, which is located close to the central attachment zone, and a distal light-emitting zone, the illuminating comprising:
   separately illuminating on at least one side of the central attachment zone the proximal light-emitting zone or the distal light-emitting zone, depending on a route to be followed, and wherein at least one of the proximal or distal light-emitting zones on one side of the central attachment zone is separately illuminated relative to a corresponding one of the proximal or distal light-emitting zone on the other side of the central attachment zone depending on the route; and
   in response to the cyclist having to make a U-turn depending on the route:
      illuminating the distal light-emitting zones on both sides of the central attachment zone simultaneously, then,
      illuminating the proximal light-emitting zones on both sides of the central attachment zone simultaneously, and
      switching all light-emitting zones off.

\* \* \* \* \*